United States Patent Office 3,055,765
Patented Sept. 25, 1962

3,055,765
SPONGE AND METHOD OF PRODUCING
THE SAME
Ralph H. Petrucci, Willoughby, Ohio, assignor to Nylonge Corporation, a corporation of Ohio
No Drawing. Filed Sept. 22, 1959, Ser. No. 841,444
4 Claims. (Cl. 106—122)

The present invention relates generally to improvements in softening or plasticizing compositions and it relates more particularly to an improved plasticizing agent for regenerated cellulose sponges and to an improved method for plasticizing regenerated cellulose sponges.

The conventional plasticizing agents commonly employed for the softening of cellulosic materials and specifically artificial regenerated cellulose sponges, fall, broadly, into two categories, those which are normally solid and those which are normally liquid. The normally liquid plasticizers are typified by glycerine and the polyethylene glycols. These materials, in addition to being normally liquid, are hygroscopic and the absorbed water enhances their plasticizing properties. However, glycerine and the usable polyethylene glycols have relatively high vapor pressures at room temperature so that they evaporate from the plasticized article if it is exposed to a low humidity atmosphere for any extended period of time. As a consequence, sponges plasticized with the usual liquid plasticizers are soft for only a short period if not tightly packaged. The normally solid plasticizers such as calcium chloride and similar hygroscopic agents possess corresponding drawbacks and disadvantages. While these solid compositions have low vapor pressures at room temperature, being normally solid, their plasticizing properties depend upon the amount of water they can absorb and hold. Since this is dependant upon the ambient humidity and the quantity of absorbed water is low at low humidities it follows that the softening effect is inadequate in many environments rendering these materials unsatisfactory as plasticizers. It is apparent from the above that the conventional and known plasticizers for cellulosic materials leave much to be desired.

It is therefore a principal object of the present invention to provide an improved softening or plasticizing composition.

Another object of the present invention is to provide an improved plasticizing agent for regenerated cellulose sponges.

Still another object of the present invention is to provide an improved plasticizing agent for regenerated cellulose sponges which is effective over long periods of time and under conditions of low humidity and which possess fungicidal properties.

A further object of the present invention is to provide an improved plasticizing composition of the above nature characterized by its low cost and ease of application.

It has been found that a preferably hygroscopic mixture of a plurality of materials which are normally solid above 25° C. said mixture requiring an amount of water to lower its melting point below 25° C. in which the partial vapor pressure of the water does not exceed 8.5 millimeters of mercury at 25° C. is an excellent plasticizing agent possessing none of the drawbacks and disadvantages of the conventional plasticizers. Where the mixture has a melting point above 25° C. it will absorb and retain sufficient amounts of water under even very dry ambient atmospheric conditions to maintain it in a liquid state and impart softeners and plasticity to a regenerated cellulose sponge. It should be noted however, that the mixture may be liquid at room temperature in the absence of water. The ingredients forming the mixture are preferably water soluble and solid above approximately 40° C. They should be substantially mutually insoluble in the solid phase and mutually soluble in the liquid phase. In addition to its excellent and superior plasticizing properties when applied to a regenerated cellulose sponge the above compositions impart high dimensional stability to the sponge. Moreover, the improved composition is preferably a substantially eutectic mixture, that is, having a melting point within several degrees C. of the eutectic point of the mixture.

An example of a highly suitable plasticizing agent of the above nature is a mixture of ammonium nitrate and urea. While the eutectic mixture consists of approximately 47 parts urea and 53 parts ammonium nitrate by weight, this ratio may be varied. Satisfactory results may be achieved employing approximately 40 to 60 parts of urea and 40 to 60 parts of ammonium nitrate in the plasticizing mixture. Both the urea and the ammonium nitrate are highly water soluble, are not mutually soluble in the solid phase and are mutually soluble in the liquid phase and the eutectic mixture thereof has a melting point of 45° C.

In plasticizing a regenerated cellulose sponge produced in the conventional and well known manner with a composition consisting of 50 parts urea and 50 parts of ammonium nitrate, the sponge was saturated with a 30% aqueous solution of the plasticizing composition and then sufficient solution expressed from the sponge to bring its plasticized weight to four times its bone-dry weight. The above plasticized sponge expanded in volume to about 105% of the corresponding water saturated sponge and after several days of air drying contracted only to 99% of the volume of the water soaked sponge. This is in sharp contrast to regenerated cellulose sponge conventionally plasticized with an aqueous solution of polyethylene glycol where the plasticized sponge had a volume of 98.5% and the air dried plasticized sponge a volume of 80% of the water saturated sponge. Furthermore, the urea-ammonium nitrate plasticized sponge is much more resistant to fungicidal attack than the ethylene glycol plasticized sponge. Moreover, the improved plasticizing composition has no solvent or adverse effect on printing inks, lacquers, adhesives and the like as is the case with such plasticizers as those containing ethylene glycol. It should be noted that the plasticizing composition of 50 parts of urea to 50 parts ammonium nitrate requires only about 3% water to impart softness to the regenerated cellulose sponge under which conditions the water has a partial vapor pressure at 25° C. of 4.7 millimeters of mercury.

Another form of plasticizing composition in accordance with the present invention comprises 30 to 60 parts of urea, 10 to 60 parts of ammonium nitrate and 0 to 40 parts of sodium nitrate. The aforesaid plasticizing composition may be applied to the regenerated cellulose sponge as an aqueous solution of 20% to 45% concentration in the manner set forth above. As a specific preferred example, a regenerated cellulose sponge was saturated with a 30% aqueous solution of a plasticizing composition consisting of 50 parts of urea, 20 parts of ammonium nitrate and 30 parts of sodium nitrate, and expressed to a 4:1 press ratio as in the first example. The resulting plasticized sponge had a volume about 103% of the water soaked sponge and when the plasticized sponge was air dried for several days its volume diminished to only 99% of the water saturated sponge. The above composition required about 10% water to soften the sponge under which conditions the partial vapor pressure of the water at 25° C. was 5.9 millimeters of mercury.

The sodium nitrate in the last plasticizing composition may be substituted in whole or in part by lithium nitrate, potassium nitrate or by a mixture thereof. When completely replaced by lithium nitrate the range of lithium nitrate is 0 to 45 parts, and by potassium nitrate the range thereof is 0 to 35 parts, the ranges of urea and ammonium nitrate being 30 to 60 parts and 10 to 60 parts respectively. The eutectic temperature of the urea, ammonium nitrate and lithium nitrate mixture is 29° C. and of the urea, ammonium nitrate and potassium nitrate mixture 48° C.

A regenerated cellulose sponge plasticized with a 30% aqueous solution of a composition consisting of 50 parts of urea, 20 parts of ammonium nitrate and 30 parts of lithium nitrate in the above manner had a volume of 104.6% of the water saturated sponge and after several days of air drying the volume diminished to 101.1%. Where the lithium nitrate is replaced by potassium nitrate in the same amount the freshly plasticized sponge had a volume of 103.5% of the volume of the water saturated sponge which volume diminished to 89.5% after several days of air drying. The urea, ammonium nitrate, lithium nitrate composition required 12% water to soften the sponge under which conditions the water partial vapor pressure at 25° C. was 4.7 millimeters of mercury and the urea, ammonium nitrate, potassium nitrate composition required 11% water to soften the sponge under which conditions the water partial vapor pressure was 8.1 millimeters of mercury.

It should be pointed out that the ratios of the various components forming the composition and falling within the designated ranges should be such that the amount of water required to bring the melting point of the composition below 25° C. have a partial vapor pressure at 25° C. below 8.5 millimeters of mercury.

Another plasticizing composition in accordance with the present invention comprises a mixture of about 51 parts acetamide and 49 parts urethane, which is applied as a 40% aqueous solution to the regenerated cellulose sponge. The volume of the plasticized sponge was about 99.5% of the water saturated sponge which diminished to 83% after several days air drying. The eutectic temperature of the mixture is 27° C.

In accordance with still another embodiment of the present invention a mixture of about 43 parts of o-nitrophenol and 57 parts of camphor is applied as a 60% solution in ethyl alcohol to the regenerated cellulose sponge. The eutectic point of the mixture is 12° C.

It is apparent from the above that the present invention provides a superior plasticizing composition and an improved plasticized regenerated cellulose sponge in which the treated sponge maintains its softness substantially indefinitely under almost all atmospheric conditions which are normally encountered. This is in sharp contrast to the performance of the conventional plasticizing agents of the above nature which either evaporate or dry and solidify in a relatively short time under many conditions, leaving the originally plasticized article in a hard or stiff condition. It is important to note however that far superior results are achieved where the plasticizing compositions employed are hygroscopic and retain their water in the manner above set forth since in the absence of such water the softness of the sponge is radically decreased. As a consequence the hygroscopic highly water soluble plasticizing agents are greatly to be preferred. Furthermore, sponges plasticized in accordance with the present invention possess a high degree of dimentional stability, a resistance to fungus attack and are compatible with inks, lacquers, adhesives and the like.

While there have been described preferred embodiments of the present invention it is apparent that numerous alterations, omissions and additions may be made without departing from the spirit thereof.

What is claimed is:

1. A regenerated cellulose sponge containing a plasticizer consisting essentially of a mixture of from 30 to 60 parts of urea and from 10 to 105 parts of at least one salt selected from the group consisting of ammonium nitrate, lithium nitrate, sodium nitrate and potassium nitrate, the melting point of said mixture in the presence of admixed water having a partial vapor pressure not exceeding substantially 8.5 millimeters of mercury at 25° C., being below 25° C.

2. A regenerated cellulose sponge in accordance with claim 1 wherein said mixture is substantially eutectic.

3. A regenerated cellulose sponge containing a plasticizing agent consisting essentially of a mixture of 40 to 60 parts of urea and 40 to 60 parts of ammonium nitrate.

4. A regenerated cellulose sponge containing a plasticizing agent consisting essentially of a mixture of a substantially eutectic mixture of urea and ammonium nitrate.

References Cited in the file of this patent
UNITED STATES PATENTS

| | | |
|---|---|---|
| 2,192,219 | Bosland | Mar. 5, 1940 |
| 2,268,832 | Konig | Jan. 6, 1942 |
| 2,352,747 | Whitehead | July 4, 1944 |